Dec. 13, 1927.
H. M. SHIELDS
ORANGE MACHINE
Filed April 22, 1926   2 Sheets-Sheet 1
1,652,379
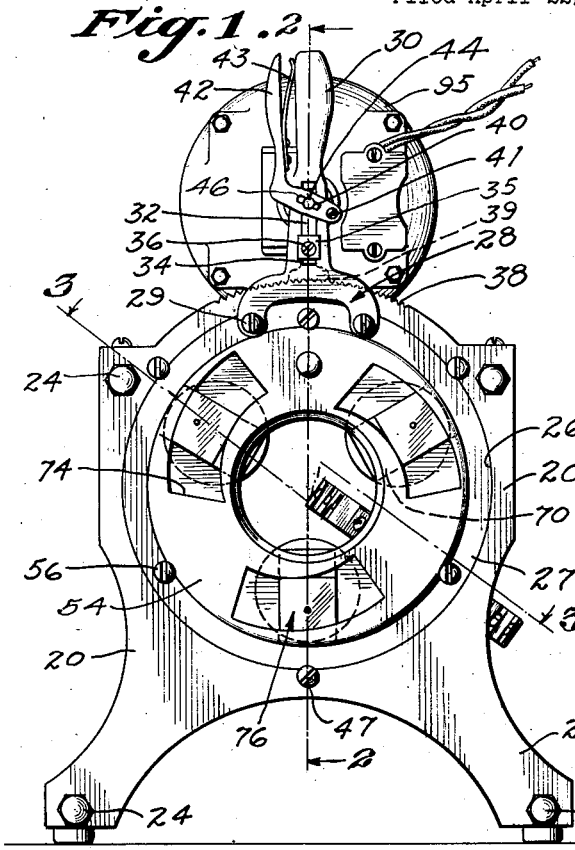
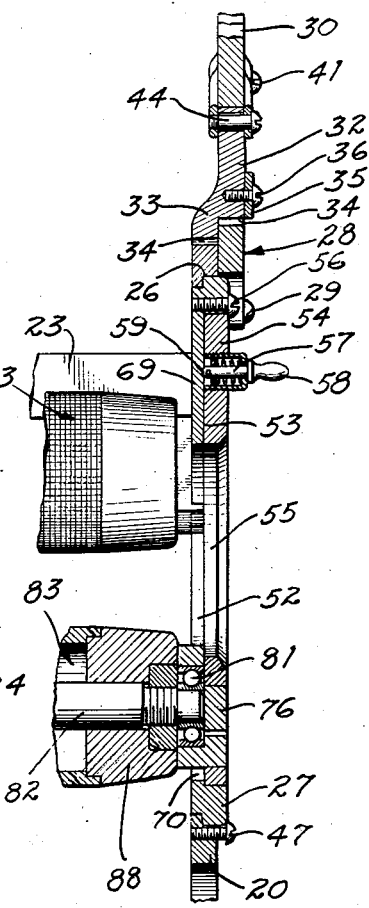
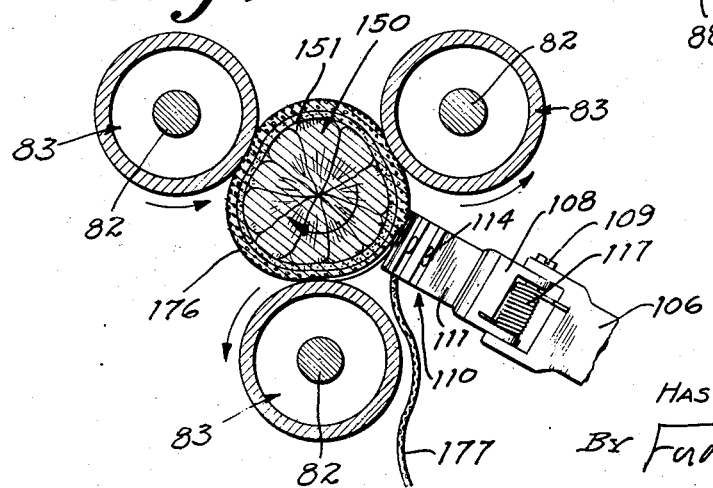
INVENTOR:
HASTINGS M. SHIELDS
By Fred A. Lauer
ATTORNEY Dec. 13, 1927.
H. M. SHIELDS
1,652,379
ORANGE MACHINE
Filed April 22, 1926 2 Sheets-Sheet 2
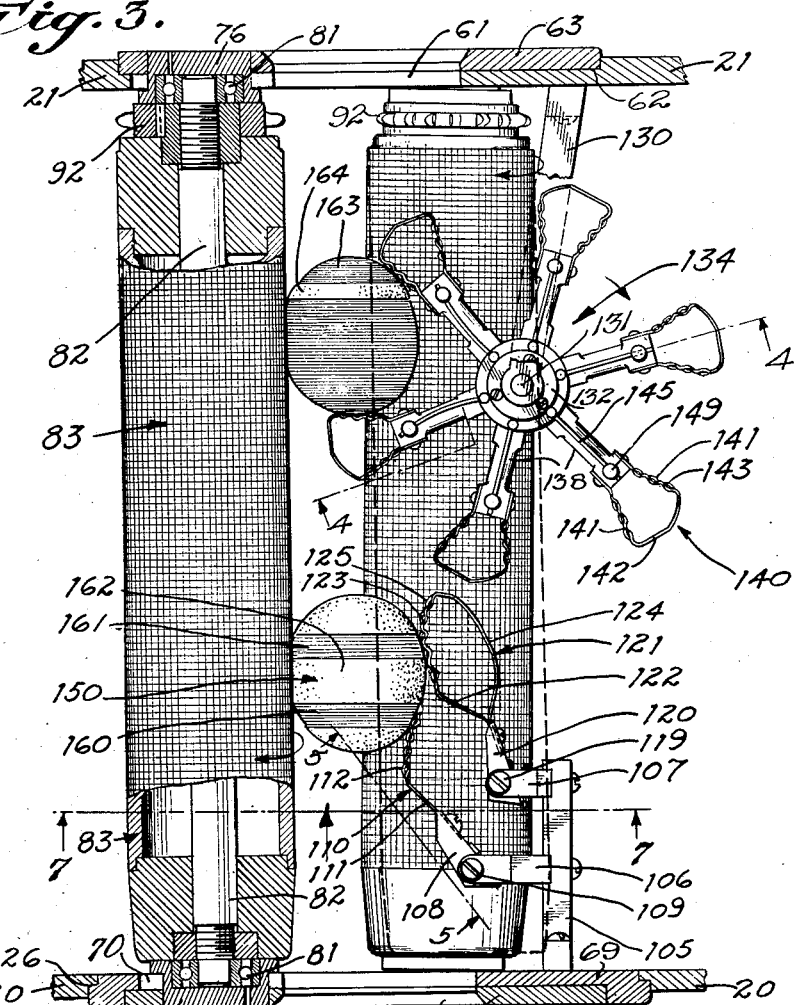
INVENTOR:
HASTINGS M. SHIELDS
BY Fad W Harris
ATTORNEY.

Patented Dec. 13, 1927.

1,652,379

UNITED STATES PATENT OFFICE.

HASTINGS M. SHIELDS, OF LOS ANGELES, CALIFORNIA.

ORANGE MACHINE.

Application filed April 22, 1926. Serial No. 103,802.

This invention relates to an apparatus for peeling fruit and for releasing and recovering volatile oils contained in the skin of the fruit.

My invention is useful for operating on various kinds of fruit but is particularly adapted for handling citrus fruit, such as oranges.

The constituent parts of an orange are valuable if properly derived, and there is an urgent need for a machine for economically deriving the constituent parts of oranges. The main parts of an orange are the rind, juice, rind oils and pectin-bearing material.

It is the general object of this invention to provide an apparatus for separating a fruit into its constituent parts as enumerated above.

Another object of my invention is to provide an apparatus for completely removing the skin from a fruit.

Ordinarily, the more volatile and the more valuable rind oils are lost in the process of extraction, only the heavier and less volatile oils being recovered.

It is an object of my invention to provide an apparatus for releasing the volatile oils of the rind of the fruit and for recovering them.

Another object of this invention is to provide an apparatus for peeling fruit, having novel peeling knives which are adapted to follow the contour of the fruit and completely remove the peel therefrom.

It is a still further object of this invention to provide a unique knife construction for removing the skin from the front and back part of the fruit.

A very important part of this invention is the portion of the apparatus by which the fruit is rotated and fed while it is being acted upon.

It is accordingly one of the objects of this invention to provide a peeling apparatus embodying a conveyor by which the fruit or other object is fed and rotated while being acted upon.

It is a still further object of this invention to provide a peeling device in which the conveyor may be adjusted to feed and rotate the fruit at a desired speed and to receive different sized fruit.

Other objects and advantages of this invention will become apparent in the following description taken in connection with the drawings in which:

Fig. 1 is an end elevation of an orange machine embodying the features of my invention.

Fig. 2 is an enlarged detail section taken on the line 2—2 of Fig. 1.

Fig. 3 is an enlarged horizontal section taken on the line 3—3 of Fig. 1 clearly showing the knife means for removing the peel from the fruit.

Fig. 4 is a section taken on the line 4—4 of Fig. 3.

Fig. 5 is a section taken on the line 5—5 of Fig. 3.

Fig. 6 is a section taken on the line 6—6 of Fig. 5.

Fig. 7 is a section taken on the line 7—7 of Fig. 3.

The form of the invention shown consists of end frames 20 and 21 which are secured in a spaced relation by cross bars 23. The ends of the cross bars are turned down and extended across openings formed in the end frames 20 and 21, there being acorn nuts 24 screwed onto the ends thereof, thus clamping the frames together.

The end frame 20 is provided with a large cylindrical opening 26 (Figs. 1, 2 and 3) in which opening 26 is placed a feed adjustment plate 27. Attached to the feed adjustment plate 27 is an adjustment lever 28 which is secured in place by screws 29. The upper end of the adjustment lever 28 is provided in the form of a handle 30. A guide portion 32 of an engager 33 is extended into a vertical slot 34 of the adjustment lever 28. A plate 35 is attached to the guide portion 32 by means of a screw 36, thus holding the engager 33 in place. The upper part of the end frame 20 is provided with teeth 38 which are engaged by teeth 39 formed on the engaging part of the engager 33. An arm 40 is pivoted at 41 to the adjustment lever 28, this arm 40 having a handle 42 and being held in a certain position by a leaf spring 43. A pin 44 extends through the upper end of the guide portion 32 of the engager 33, which pin extends through slots 46 formed in the lower part of the arm 40. When the handle 42 of the arm 40 is moved towards the handle 30, the engager 33 is lifted and disengaged from the teeth 38. This permits the feed adjustment plate 27 to be rotated in the cylindrical opening 26. Screws 47 are provided for keeping the feed adjustment plate 27 from moving outwardly from the cylindrical opening 26.

The feed adjustment plate 27 has a central cylindrical opening 52 which is surrounded by an exterior annular recess 53. Resting in the annular recess 53 is a radial adjustment plate 54 which has a cylindrical opening 55 which aligns with the cylindrical opening 52 of the feed adjustment plate 27. The radial adjustment plate 54 is retained in the annular recess 53 by screws 56, as shown best in Fig. 2. A spring actuated plunger 57 having a handle 58 is provided whereby the radial adjustment plate 54 may be rotated in the annular recess 53. The inner end of this spring actuated plunger 57 is adapted to engage in depressions 59 formed at the bottom of the annular recess 53 whereby the radial adjustment plate 54 may be resiliently retained in a certain position.

The end frame 21 has a cylindrical opening 61 which is surrounded by an external annular recess 62 in which a radial adjustment plate 63 is placed, this radial adjustment plate 63 being similar to the radial adjustment plate 54 and provided with a spring actuated plunger, similar to the one designated by the numeral 57. The radial adjustment plate 63 may be rotated by means of the handle 66, the inner end of the plunger 65 being adapted to engage in depressions 67 formed at the bottom of the annular recess 62 whereby this radial adjustment plate 63 may be retained in a certain position.

An inner wall 69 which forms the bottom of the annular recess 53 is provided with three equally spaced radial slots 70, and the radial adjustment plate 54 is provided with three equally spaced spiral slots 74 (Fig. 1), and the opposite end plate 21 and the radial adjustment plate 63 are provided respectively with three equally similar radial and spiral slots.

The numeral 76 represents bearing blocks, one of which is carried in each pair of radial and spiral slots. There are three bearings 81 carried by each radial adjustment plate, and these bearings are arranged in pairs. Each pair of bearings 81 rotatably supports a shaft 82 on which a roller 83 is fixed. The forward ends of the respective rollers 83 have conical outer faces 88 and therefore the extreme forward ends of the rollers are tapered so as to form a mouth such as will be described later and the opposite end of each roller has secured thereon a sprocket 92.

Referring particularly to Fig. 5, the numeral 105 represents a bar which is secured to the end frame 20. Attached to the bar 105 are brackets 106 and 107. The bracket 106 has a pivot block 108 pivoted thereto by means of a pin 109. The pivot block 108 has a booster knife 110 secured thereto, this booster knife being illustrated in Figs. 3 and 7. The knife 110 has an arm portion 111 at the end of which a knife portion 112 is formed. The knife portion 112, as shown in the drawings, is provided with a plurality of openings 114.

Referring to Fig. 6, the knife portion 112 is provided with knife formations 115 which are situated directly below each opening 114. The knife formations 115 are formed by bulging the knife portion 112 into a number of semi-cylindrical forms, as illustrated. The upper edge of the knife formations terminate at the openings 114 in the form of knife edges 116. A spring 117 surrounds the pin 109 for the purpose of holding the booster knife 110 in an innermost position, as will be described later. The bracket 107 is provided with a pivot pin 119 for the purpose of pivoting a pivot block 120 thereto. The pivot block 120 supports a secondary knife 121. The secondary knife 121 is provided with an arm portion 122 at the end of which a knife portion 123 is formed. A brace portion 124 extends from the outer end of the knife portion 123 to the pivot block 120 as shown best in Fig. 3. The construction of the knife portion 123 is substantially the same as the construction of the knife portion 112 of the booster knife 110. The knife portion 123 has knife formations 125. A spring similar to the spring 117 is provided around the pivot pin 119 for the purpose of holding the secondary knife 121 in innermost position.

Attached to the end frame 21 is a bracket 130 to the end of which a pivot shaft 131 is attached. The pivot shaft 131 rotatably carries a hub 132 of a star assembly 134. The hub 132 consists of a body 135 and a plate 135ª which surround the pivot shaft 131. The hub 132 provides an annular channel 136 into which inner ends 137 of arms 138 extend. The ends 137 are pivoted in the annular channel 136 by pins 139. (See Fig. 4.) The outer ends of the arms 138 are provided with knives 140 which consist of opposing knife portions 141 and a central outer arm portion 142. The construction of the knife portions 141 is substantially the same as the construction of the knife portions 112 and 123, these knife portions 141 having knife formations 143 which are formed substantially the same as the knife formations 115. The arms 138 are normally retained in a radially extending position by spring members 145. The inner ends of the spring members 145 are provided with eyes 146 which surround each pivot pin 139. The outer ends of the spring members 145 extend through openings 148 of projections 149 which extend from the ends of the arms 138. During the operation of the device, however, the arms 138 may be moved against the action of the springs 145 from exact radial position. This will be described when the operation of my invention is being considered.

Before utilizing that portion of my invention which has just been described, it is necessary to make a few preparatory adjustments. The rollers 83 of my invention are first radially adjusted so that the innermost portions thereof define a circle which is of proper size to accommodate the object which is to be fed therethrough. In discussing the operation, we will consider the use of the invention in handling a citrus fruit such as an orange represented by the numeral 150, Figs. 3 and 7. It is desirable to adjust the rollers 83 so that they define a circle slightly smaller than the circumference of the orange 150. This is desirable so that sufficient friction may be obtained and so that the rind 151 of the orange will be compressed and bulged as will be later described, so as to release the oil therefrom. This adjustment is accomplished by first loosening the screws which retain the radial adjustment plates 54 and 63 in place. The handle 57 is then engaged and the radial adjustment plate 54 is rotated. When this plate is rotated, different portions of the spiral slots 74 are brought into adjacency with the portions 77 of the bearing blocks 76 at the end of the machine, and these blocks are therefore moved inwardly or outwardly according to the direction in which the radial adjustment plate 54 is rotated. This radial adjustment plate, however, is moved into such a position that these ends of the rollers 83 will be properly spaced to receive the orange 150. The radial adjustment plate 63 is then similarly adjusted in order to move the other ends of the rollers 83 radially into proper positions. After this adjustment has been effected, the radial adjustment plates 54 and 63 are clamped in these positions.

The next operation in setting the machine is to adjust the rollers into proper feeding position.

The feeding adjustment comprises a twisting of the rollers 83 from parallelism with the path of travel of the oranges is accomplished by rotating the feed adjustment plate 27. To rotate this feed adjustment plate 27 the adjustment lever 28 is engaged and the handle 42 is moved toward the handle 30. This has the effect, as previously mentioned, of lifting the engager 33, thus disengaging it from the teeth 38 formed on the end frame 20. The feed adjustment plate 27 may then be rotated in either direction. It is evident that the ends of the rollers adjacent to the feed adjustment plate 27 are moved circumferentially, whereas the other ends of the rollers remain stationary. The feed adjustment plate 27 may be rotated in either direction so that, if desired, the oranges may be fed in a reverse direction through the apparatus. This completes the setting up of the machine and it is now ready for operation.

The particular means for supporting, adjusting, and driving the rollers to revolve and feed the oranges through the machine does not constitute a vital part of the present invention as it is evident that the peeling arrangement may be utilized in connection with other types of feeding mechanism. In the form shown and briefly described herein, the rollers may be driven in unison by a motor 95 through a suitable chain engaging all of the three roller sprockets 92. For a more complete disclosure of this type of feed mechanism reference may be had to my copending application, Serial No. 42,026, filed July 7, 1925.

The orange 150 is inserted into the inlet end of the space provided between the rollers 83. The inlet end is shown in Fig. 2 and is that end at which the rollers are provided with conical faces. These conical faces provide a mouth into which the orange 150 is drawn. The orange when it is placed between the rollers is gradually drawn into the path and as it is drawn thereinto, pressure is gradually applied thereon so that the orange will not be in any way ruptured. The orange is fed according to the principle described in connection with Fig. 12, and passes between the rollers 83 through the exhaust end of the apparatus.

As the orange moves forwardly along the path, the forward end thereof engages the arm portion 111 of the knife 110 and swings it outwardly so that the orange may move thereby. After the orange moves by the arm portion 111 of the knife 110, the knife 110 may move inwardly and the knife portion 112 thereof will engage the back part of the orange 150, cutting the rind away as indicated at 160. I have discovered that cutting away the rind at the rear part of the orange has a boosting effect, and the speed of travel of the orange along the path is immediately accelerated. The forward part of the orange upon its movement by the booster knife 110 comes in contact with the knife portion 123 of the secondary knife 121. The secondary knife 121 removes the central part of the rind of the orange, as indicated at 161, and also a portion of the rind indicated at 162, which portion has not yet been removed by the secondary knife 121. The booster knife 110 and the secondary knife 121 remove the central portion of rind from the orange 150, leaving the end portions intact thereon. It is desirable to leave the end portions until the last by reason of the fact that the end portions of the rind serve to reinforce the orange and keep it from falling apart which might occur if the end portions were removed first. The rind is cut off in long strips by the cutting edges of the knife formations 115 and 125.

After the orange has passed the booster and secondary knives, it moves into engagement with the knives 140 of the star assembly 134. The forward end of the orange engages an innermost knife of the star assembly 134 and moves it in front thereof in the same direction as the orange is passing. This rotates the entire star assembly. The back knife portion 141 engages the forward end of the orange and removes the rind therefrom as indicated by the numeral 163. This knife also removes that portion of the rind indicated by the numeral 164. The cutting action of this knife portion is the same as the cutting action of the knife portions of the booster knife 110 and the secondary knife 121. After the orange has engaged the arm, just mentioned, and has moved the star wheel a slight distance, the front knife portion 141 of the next knife 140 engages the rear part of the orange and removes the entire end portion of the rind therefrom, as illustrated in Fig. 3. The arms are spaced so that the distance between the adjacent knife portions are slightly smaller than the size of the orange. For this reason the arms 138 are spread from normal radial extension against the action of the springs 145. In this manner a slight pressure is applied to the engaged surface of the orange so that the cutting action may be had. When the orange leaves a star assembly, the star assembly is in such a position that one arm extends into the path of the orange ready for engagement by the next orange which is acted upon, as just described. The knife portions of the cutting knives of the invention, as noted particularly in Fig. 11, are formed so that the knife formations 115 are projected beyond the main path of the knife. This permits the knife formations to cut only a certain depth.

When the orange leaves the exhaust end of the apparatus, the rind is completely removed therefrom.

Referring to Fig. 7, the peel as mentioned is cut off in strips as indicated by the numeral 177, which peel drops into a suitable receiver.

While the form of mechanism herein illustrated and described is fully capable of fulfilling all of the objects primarily stated, it is to be understood that I do not wish to limit the invention thereto for it is susceptible of embodiment in various other forms, all coming within the scope of the claims, which follow.

I claim as my invention:

1. In combination in a peeling machine: a plurality of substantially radially extending arms; knives at the outer ends of said arms; means for supporting said arms; and means for resiliently holding said arms in certain positions.

2. In combination in a peeling machine: a plurality of arms; knives at the outer ends of said arms, there being a pair of knife portions provided by each knife; means for supporting said arms; and means for resiliently holding said arms in certain positions.

3. In combination in a peeling machine: a plurality of substantially radially extending arms; knives at the outer ends of said arms, there being a pair of knife portions provided by each knife; means for supporting said arms; and means for resiliently holding said arms in certain positions.

4. In combination in a peeling machine: a plurality of arms; knives at the outer ends of said arms; a hub for pivotally supporting said arms; and means for resiliently holding said arms in certain positions.

5. In combination in a peeling machine: a plurality of substantially radially extending arms; knives at the outer ends of said arms; a hub for pivotally supporting said arms; and means for resiliently holding said arms in certain positions.

6. In combination in a peeling machine: a plurality of arms; knives at the outer ends of said arms, there being a pair of knife portions provided by each knife; a hub for pivotally supporting said arms; and means for resiliently holding said arms in certain positions.

7. In combination in a peeling machine: a plurality of substantially radially extending arms; knives at the outer ends of said arms, there being a pair of knife portions provided by each knife; a hub for pivotally supporting said arms; and means for resiliently holding said arms in certain positions.

8. In combination in a peeling machine: a plurality of arms; knives at the outer ends of said arms; means for supporting said arms; and springs connected to said means and said arms for resiliently holding said arms in certain positions.

9. In combination in a peeling machine: a plurality of arms; knives at the outer ends of said arms, there being a pair of knife portions provided by each knife; means for supporting said arms; and springs connected to said means and said arms for resiliently holding said arms in certain positions.

10. In combination in a peeling machine: a plurality of substantially radially extending arms; knives at the outer ends of said arms, there being a pair of knife portions provided by each knife; means for supporting said arms; and springs connected to said means and said arms for resiliently holding said arms in certain positions.

11. In combination in a peeling machine: a knife having openings formed therein, the portions adjacent to said openings being bulged to form knife formations, said knife formations terminating at said openings and being sharpened to have cutting edges.

12. A peeling machine comprising: means for feeding and rotating an object in a certain path; and means for acting on the surface of said object, said means comprising a plurality of arms, knives at the outer ends of said arms, means for supporting said arms, and means for resiliently holding said arms in certain positions.

In testimony whereof, I have hereunto set my hand at Los Angeles, California, this 16th day of April, 1926.

HASTINGS M. SHIELDS.